2,819,311

PRODUCTION OF VITAMIN A ALDEHYDE

Howard C. Klein, Brooklyn, N. Y., and Davide R. Grassetti, Nutley, N. J., assignors to Nopco Chemical Company, Harrison, N. J., a corporation of New Jersey No Drawing. Application November 4, 1955
Serial No. 545,122

7 Claims. (Cl. 260—598)

This invention relates to vitamin A aldehyde and to a method for producing vitamin A aldehyde.

In U. S. patent application Serial No. 545,125 of Schaaf, Klein and Kapp, filed concurrently herewith, there is disclosed a procedure for producing a compound having vitamin A activity, which compound is highly useful as an intermediate in the production of vitamin A. This compound is referred to in the Schaaf, Klein and Kapp application as "compound IV" and will be referred to herein as compound IV.

Compound IV when tested biologically on rats shows a vitamin A activity of about 50%. Its ultra-violet spectrographic characteristics are practically identical with those of vitamin A; however, infra-red spectrographic analysis shows that compound IV does not contain a hydroxyl group. Analysis of compound IV discloses the presence of an N-H stretching band in the infra-red spectrographic curve of compound IV indicating the presence in compound IV of either a primary or a secondary amino group. Analysis of compound IV by the Kjeldahl method shows that compound IV has a nitrogen content of about twice the nitrogen content of the vitamin A amine (referred to hereafter as "vitamin A amine") wherein an amine group has replaced the hydroxyl group of vitamin A. The physical and chemical characteristics of compound IV indicate that it contains the vitamin A chromophoric system wherein the hydroxyl group of vitamin A has been replaced by a basic fragment similar to a major portion of the hexamethylene tetramine molecule. It is a viscous liquid soluble in ethyl ether, ethyl alcohol, acetone and similar solvents. It has an absorption maximum in the ultra-violet at 3250 A. and has at that wave length an extinction coefficient of about 1000. If it is treated with hydrobromic acid, a product is obtained which has an absorption maximum at 3300 A. Likewise treatment of compound IV with phosphoric acid gives a product having an absorption maximum at 3280-3000 A. Presumably salts of compound IV are formed by the treatments with hydrobromic acid and phosphoric acid since treatment of the products with alkali gives in each case the original compound IV. Acetylation of compound IV with acetic anhydride gives a product which when analyzed by infra-red analysis shows the presence of an amide band in the infra-red spectrographic curve.

It is disclosed in the Schaaf, Klein and Kapp application referred to hereinabove that compound IV can be prepared from a material having the empirical formula $C_{20}H_{30}O$, which compound contains the β-ionone ring structure, four ethylenic bonds and one hydroxyl group and which in the trans configuration has an absorption maximum in the ultra-violet at 2710 A., a molecular extinction coefficient at that wave length of 29,100 and has a refractive index at 20° C. of about 1.552, and which in the cis configuration has an absorption maximum in the ultra-violet at 2740 A., a molecular extinction coefficient of 25,900 and has a refractive index at 16° C. of about 1.535. This compound, both the cis and the trans form of it, is referred to in the Schaaf, Klein and Kapp application as "compound I" and will be so referred to herein.

It is believed that compound I has the folowing structural formula:

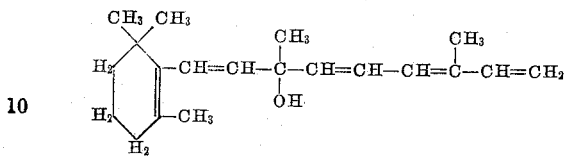

Compound I

In the Schaaf, Klein and Kapp application it is disclosed that compound IV may be prepared by treating either the cis or the trans form of compound I with boron trifluoride hexamethylene tetramine complex under appropriate reaction conditions in a water-containing aromatic hydrocarbon solvent solution. This procedure gives yields of compound IV in the neighborhood of 30%. When this procedure is carried out at room temperature a reaction time in the neighborhood of approximately 40 hours is usually employed.

In U. S. patent application Serial No. 545,123 of Klein, Beckmann and Schaaf, filed concurrently herewith, there is disclosed a procedure for producing compound IV which is an improvement over the procedure disclosed in the Schaaf, Klein and Kapp application referred to above. In the Klein, Beckmann and Schaaf procedure compound IV is produced by reacting compound I with boron trifluoride hexamethylene tetramine complex under appropriate reaction conditions in a solvent selected from the group consisting of acetone, acetonitrile, acrylonitrile, benzyl cyanide, dioxane, isopropenyl acetate and tetrahydrofuran. The preferred solvent is dioxane containing a small amount of water.

It is the object of this invention to provide a procedure for producing vitamin A aldehyde from compound IV.

Other objects of this invention will in part be obvious and will in part appear hereinafter.

The above and other objects of the invention are accomplished by treating compound IV with iodine in a solvent solution. This treatment converts compound IV to vitamin A aldehyde in very excellent yield.

The treatment of compound IV with iodine can be carried out in any one of a number of different solvents. Any solvent which does not react with, i. e. is inert to, iodine and compound IV and will form a substantially homogeneous solution with them can be used. Thus the aromatic hydrocarbon solvents employed in the procedure of the Klein, Schaaf and Kapp application, i. e. benzene, toluene, xylene, methyl isopropyl benzene, isopropyl benzene, ethyl benzene, diethyl benzene, mesitylene, butyl benzene, amyl benzene, etc. and similar aromatic hydrocarbon solvents can all be used as the solvent for the treatment of compound IV with iodine. Likewise, the various solvents employed in the procedure of Klein, Schaaf and Beckmann referred to hereinabove can be employed as the solvent in which to carry out the treatment of compound IV with iodine. Mixtures of the above solvents can be employed if desired. The preferred solvent is dioxane containing a small amount of water.

In treating compound IV with iodine to convert compound IV to vitamin A aldehyde, from one to ten parts by weight of iodine based on the weight of the compound IV being treated is employed. The preferred ratio is from about two to four parts of iodine by weight for each part by weight of compound IV.

In reacting the iodine with compound IV, the reaction mixture is heated, preferably at the reflux temperature of the reaction mixture, for a short time. Usually from about fifteen minutes to half an hour is ample to convert the compound IV to vitamin A aldehyde.

If the reaction has been carried out in a water-miscible solvent, it is preferred to add an excess of a water-immiscible solvent to the reaction mixture on completion of the reaction. The excess iodine is then eliminated from the reaction mixture by adding sodium thiosulfate to the reaction mixture in an amount sufficient to remove from the reaction mixture all of the iodine color. Any excess sodium thiosulfate which had been added to the reaction mixture and any water-miscible solvent which is present is then removed by washing the reaction mixture with water. The vitamin A aldehyde is then readily recovered from the reaction mixture by removing any water and the solvent or solvents from the reaction mixture by any suitable means such as by evaporation. In all cases a very excellent yield of vitamin A aldehyde which is completely free of anhydro vitamin A is obtained.

For a fuller understanding of the nature and objects of the invention, reference may be had to the following examples which are given merely for purposes of illustration and are not to be construed in a limiting sense:

*Example I*

50 mg. of compound IV having a purity of approximately 60% as determined by spectroscopic analysis were dissolved in a solution of 30 ml. of dioxane. 10 ml. of water and 88.9 mg. iodine were then added thereto. The mixture was refluxed for half an hour on a steam bath. The reaction mixture was then cooled under nitrogen and approximately an equal volume of hexane added thereto and the iodine color discharged from the reaction mixture using a 10% solution of aqueous sodium thiosulfate. The excess sodium thiosulfate and the dioxane were then removed by washing the reaction mixture with water, after which the hexane solution was dried over sodium sulfate and the hexane evaporated. Vitamin A aldehyde having a maximum of 3750 A. when analyzed by ultra-violet spectrographic analysis was obtained in a yield of 53.5%. The ultra-violet spectographic analysis showed that no anhydro vitamin A was present.

Having described our invention, what we claim as new and desire to secure by Letters Patent is:

1. A process for producing vitamin A aldehyde which comprises treating with iodine in the presence of an inert solvent an organic compound having the following characteristics: (1) an absorption maximum in the ultra-violet at 3250 A. with an extinction coefficient at that wave length of 1000, (2) when treated with hydrobromic acid gives a product having an absorption maximum in the ultra-violet at 3300 A., (3) when treated with phosphoric acid gives a product having an absorption maximum in the ultra-violet of 3280–3300 A., (4) has a Kjeldahl nitrogen content of 9.6%, (5) when treated with acetic anhydride gives a product the infra-red spectographic curve of which contains an amide band, (6) when treated with aluminum isopropoxide is converted to vitamin A amine, and (7) has a vitamin A activity of approximately 50% when tested biologically.

2. The process of claim 1 wherein the organic solvent is selected from the group consisting of aromatic hydrocarbon solvents, acetone, acetonitrile, acrylonitrile, benzyl cyanide, dioxane, isopropenyl acetate and tetrahydrofuran.

3. The process of claim 1 wherein from one to ten parts by weight of iodine for each part by weight of the organic compound is employed.

4. The process of claim 3 wherein from two to four parts by weight of iodine for each part by weight of the organic compound is employed.

5. The process of claim 1 wherein the solvent solution of the iodine and the organic compound is heated at about reflux temperature for a period of at least about fifteen minutes.

6. The process of claim 4 wherein the solvent solution of the iodine and the organic compound is heated at about reflux temperature for a period of at least about fifteen minutes.

7. A process for producing vitamin A aldehyde which comprises refluxing for about 15 to 30 minutes with iodine in the presence of an inert solvent an organic compound having the following characteristics: (1) an absorption maximum in the ultra-violet of 3250 A. with an extinction coefficient thereat of 1000, (2) when treated with hydrobromic acid gives a product having an absorption maximum in the utlra-violet at 3300 A., (3) when treated with phosphoric acid gives a product having an absorption maximum in the ultra-violet of 3280–3300 A., (4) has a Kjelahl nitrogen content of 9.6%, (5) when treated with acetic anhydride gives a product, the infra-red spectrographic curve of which contains an amide band, said inert solvent being selected from the group consisting of aromatic hydrocarbon solvents, acetone, acetonitrile, acrylonitrile, benzyl cyanide, dioxane, isopropenyl acetate and tetrahydrofuran, and said iodine being present in an amount between 1 to 10 parts by weight per part of said organic compound.

No references cited.